Oct. 28, 1958 J. O. PREISIG 2,858,365

COLOR SYNCHRONIZATION

Filed Nov. 13, 1953

INVENTOR.

JOSEPH O. PREISIG

BY [signature]

ATTORNEY 2,858,365

COLOR SYNCHRONIZATION

Joseph O. Preisig, Trenton, N. J., assignor to Radio Corporation of America, a corporation of Delaware Application November 13, 1953, Serial No. 391,800

17 Claims. (Cl. 178—5.4)

Figures 1, 2:
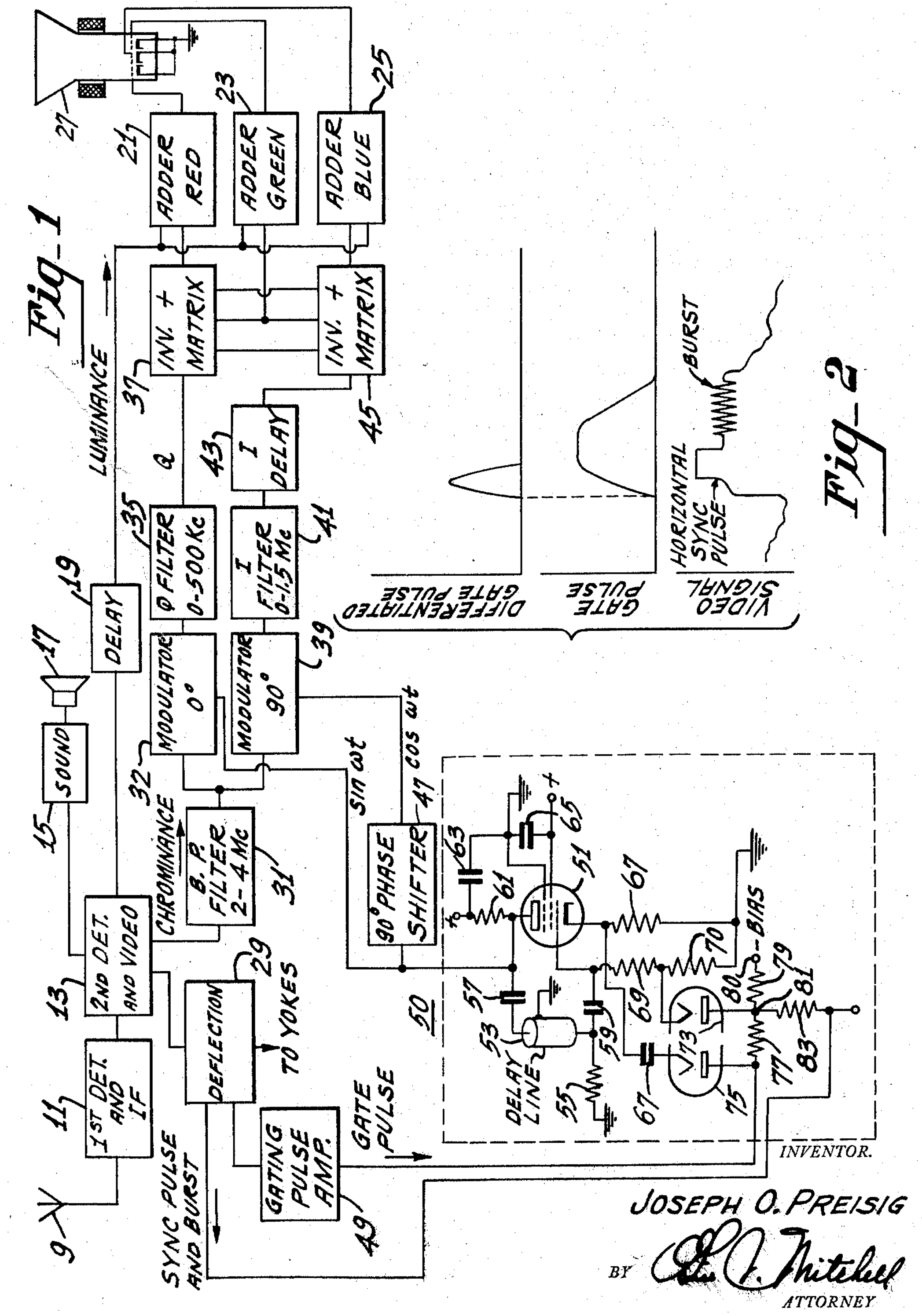

The present invention relates to signalling circuits, and more particularly to color synchronization of the type employed in color television receivers.

Color television is the reproduction on the viewing screen of a receiver of not only the relative luminescence or brightness, but also the color hues and saturations and chromaticities of the details in the original scene.

Complete cooperation between the transmitter and receiver is essential in the successful operation of television equipment. As a result much emphasis is placed on the development and utilization of synchronizing methods. This is particularly true in color television wherein not only is it necessary to maintain accurate deflection scanning but it is also necessary to maintain accurate synchronism in the timing of component color selection.

In order to utilize the existing radio frequency spectrum most advantageously, there has been proposed a color television system which conforms to a set of standards known as the NTSC compatible television standards which are described at page 88 of "Electronics" for February 1952. In this system of transmission the transmission of a brightness signal is substantially the same as that conventionally employed for black and white television transmission. In addition, a color subcarrier wave, spaced from the main carrier wave by a frequency substantially equal to that of an odd multiple of one-half the line scanning frequency, is employed to carry the chromaticity information.

The chromaticity information is produced in the form of two color difference signals, I and Q having bandwidths of 1.5 mc. and 0.5 mc. respectively. By impressing these color difference signals upon the subcarrier in proper phase, the chromaticity information is included in the video signal and transmitted to the receiver where it is demodulated, separated into its primary or component color information and then applied to the output color image reproducer.

It is to be noted that the reproduction of the proper color in a color television receiver is very highly dependent upon accurate timing of the color selection and that the phases of the various signals which convey the color information be produced with considerable accuracy. Synchronization is accomplished by the periodic transmission of a 3.58 mc. burst of a signal wave equal in frequency to the unmodulated subcarrier carrying this color information. A good description of the employment of the burst for color synchronization may be found in an article entitled "Recent Developments in Color Synchronization in the RCA Color Television System," published February 1950 by the Radio Corporation of America.

In order to properly demodulate the I and Q signals it is necessary to produce a signal whose frequency is 3.58 mc. in the receiver circuit. The most important aspect of this produced frequency is that it maintain proper phase with respect to the phase of the burst signal and that it continue with this phase until the line has been completely scanned at which point a synchronizing pulse followed by a new burst appears and the scanning process begins again. Once this phase has been established, assuming of course that the frequency is correct, the relative phases of the I and Q signals may then be themselves established using delay lines of proper characteristics.

There are many ways of producing the 3.58 mc. color signal in the color television receiver circuit. The method which is employed in the invention to be described utilizes principles involving frequency and phase synchronization based on the property that when a signal of fixed frequency and phase is interjected into a free-running oscillator at the right point, the frequency and phase of the free-running oscillator will fall in step with that of the injected signal should the operating parameters be suitable for this action to take place. The basic principles of phase synchronization are well known having been discussed in such books as for example chapter 12 of "Harmonics, Sidebands and Transients in Communication Engineering," by C. Louis Cuccia, McGraw-Hill Book Co., 1952. The present invention, however, utilizes the principle of injecting locking in a very effective manner by working in conjunction with a gating pulse and the horizontal synchronizing pulse which turn the oscillator off at the end of the scanned line and start the oscillator again at the start of the line at the frequency and phase which is prescribed by the burst.

It is a primary object of the present invention to improve the timing of the color selection in a color television receiver.

Another object of this invention is to permit more accurate selection of color information.

Another object of the invention is to simplify the circuitry and to reduce the number of tubes involved in the production of the desired subcarrier sampling frequency compared to presently used circuits.

A still further object of this invention is to combine the method of injection lock for phase synchronization with the utilization of the gating and horizontal synchronizing pulses for starting and stopping the color synchronization signal.

According to this invention the source of the color synchronizing signal is an oscillator circuit which uses a delay line for obtaining proper feedback. The negative synchronizing pulse and the burst signal, which is gated by a kickback gating pulse taken from a winding on the high-voltage transformer, are applied to the oscillator circuit in such a way that the oscillation is cut off by the negative synchronizing pulse and is started again by the burst signal. The feedback delay line has dimensions suitable for obtaining proper phase over the time of one line time duration. Differentiations of the kickback pulse may be used additionally by feeding them into the cathode or of the suitable tube electrodes to support the stop action of the negative synchronizing pulses.

Other and incidental objects and advantages of this invention will become apparent from a reading of the following specification and an inspection of the accompanying drawings in which:

Figure 1 shows a basic color television circuit which utilizes the synchronizing start-stop oscillator as a source of the color synchronizing signal; and Figure 2 shows respectively the video signal including the burst, the gating pulse which is produced by the kickback circuit, and the differentiated gate pulse for the leading edge of the gate pulse.

In order to provide for a better understanding of the present invention, a summary of the basic principles of transmission which conform to the NTSC standards for color television transmission are presented as follows, the description relating to both the formation of the color television image signal at the transmitter and the means of accommodating and utilizing this signal in the circuitry which comprises the modulation and demodulator of such signals.

The camera contains three pickup tubes or transducing elements which provide electrical signals corresponding to the red, green, and blue components of the scene to be televised. The signals are then matrixed or cross-mixed to produce a luminance signal (M) and the two chrominance signals, I and Q.

In the modulator section, the I and Q signals are modulated upon two subcarriers of the same frequency but 90° apart in phase. The modulators employed should be of the doubly-balanced type, so that both the carriers and the original I and Q signals are suppressed, leaving only the sidebands. Some sort of keying circuit must be provided to produce the color synchronizing bursts during the horizontal blanking intervals. To comply with the N. T. S. C. signal specifications, the phase of the burst should be 57° ahead of the I component (which leads the Q component by 90°). This phase position, which places the burst exactly 180° out of phase with the B–M component of the signal, was chosen mainly because it permits certain simplifications in receiver designs. Timing information for "keying in" the burst may be obtained from a "burst flag generator," which is a simple arrangement of multivibrators controlled by horizontal and vertical drive pulses.

In the mixer section, the M signal, the two subcarriers modulated by the I and Q chrominance signals, and the color synchronizing bursts are all added together. Provision is also made for the addition of standard synchronizing pulses, so that the output of the mixer section is a complete color television signal containing both picture and synchronizing information. This signal may then be put "on the air" by means of a standard television transmitter.

The basic operations performed in a compatible color receiver are described as follows: The antenna, R. F. tuner, I. F. strip, and second detector serve the same functions as the corresponding components of a black-and-white receiver. The sound signal may be obtained from a separate I. F. amplifier, or it may be obtained from the output of the second detector by using the well-known "intercarrier sound" principle. The video signal obtained from the second detector of the receiver is, for all practical purposes, the same signal that left the color television studio. The receiver up to this point is no different from a black-and-white receiver except that the tolerance limits on performance are somewhat tighter.

Turning now in more detail to Figure 1, there is provided a color television receiver which includes the appropriate circuits for developing the video signals and sound signals. As the video signal is received by the antenna 9 and is passed through the first detector and I. F. units 11 to the second detector and video amplifier 13 the sound signal is extracted, passed through a sound amplifier 15 and reproduced by the loud speaker 17. Also at the second detector and video amplifier 13 there is separated the synchronizing and color signals, the synchronizing signals going to the deflection system circuits 29 and the color signals recovered in appropriate circuits and applied to the color kinescope 27. The luminance signals pass through the delay line 19 to the red adder 21, the green adder 23 and the blue adder 25. The chrominance signal which has issued from the second detector and video amplifier 13 through the band pass filter 31, is passed through the I and Q circuits to the inverters and matrices 37 and 45, where red, green and blue color difference signals are formed and supplied to the aforementioned adders. The luminance and color difference signals combined to form the color signals which are then presented to the color kinescope.

It will be seen that the signal from the second detector 13 is utilized in three circuit branches. One circuit branch directs the complete signal toward the color kinescope 27 where it is used to control luminance by being applied to all kinescope guns in equal proportions. In the second circuit branch, a band-pass filter 31 separates the high-frequency components of the signal (roughly 2.0 to 4.1 mc.) consisting mainly of the two-phase modulated subcarrier signal. This signal is applied to a pair of modulators 32 and 39 which operate as synchronous detectors to recover the original I and Q signals.

The remaining circuit branch at the output of the second detector 13 makes use of the timing or synchronizing information in the signal. A conventional sync separator is used to produce the pulses needed to control the horizontal and vertical deflection circuits 29 which are also conventional. The high voltage supply for the kinescope ultor may be obtained either from a "fly-back" supply associated with the horizontal deflection circuit or from an independent R. F. power supply. Many color kinescopes require convergence signals to enable the scanning beams to coincide at the screen in all parts of the picture area; the wave-forms required for this purpose are readily derived from the deflection circuits 29.

The final branch at the output of the second detector 13 includes the gating pulse amplifier 49 and the diodes 73 and 75, which are turned "on" only for a brief interval during each horizontal retrace interval by means of a kickback or gating pulse obtained from the gating pulse amplifier 49. The bursts are separated by the diodes 73 and 75 and injected into the circuit of a local oscillator 50 as the oscillator starts its oscillations following the horizontal synchronizing pulses—being turned off at the end of each scanned line by a combination of the kickback pulse and the horizontal synchronizing pulse. This injected burst into the oscillator circuit keeps the receiver oscillator in synchronism with the master subcarrier oscillator at the transmitter. The output of the oscillator 50 provides the reference carriers for the synchronous detectors as contained in the 0° modulator 32 and the 90° modulator 39; a 90° phase shifter 47 is necessary to delay the phase of the Q modulator by 90° relative to the I modulator.

Consider now the start-stop oscillator circuit 50, which is the source of the color synchronization signal which upon having its phase established by the burst signal issues a sine wave of prescribed phase to the Q modulator and a cosine wave to the I modulator, the output of the oscillator being passed through a 90° phase shifter 47 to produce the properly phased I signal.

In the start-stop oscillator circuit 50 the basic oscillator is formed by the vacuum tube 51 which has a delay line 53 connected through bypass condensers 57 and 59 between the plate circuit and grid circuit of the tube 51. The length of this delay line is such that proper phase and frequency of the oscillator are established. By making resistors 61 and 55 of suitable magnitude the delay line may be properly terminated and free-ringing oscillations of this line can thereby be suppressed. In the grid and cathode circuit of tube 51 there are the resistors 67, 69 and 70 which are of suitable magnitude to enhance oscillation.

As the oscillator circuit 50 stands, it will operate as a free-running oscillator yielding a signal substantially near to 3.58 mc. It is evident that although the specific embodiment of the oscillator is a delay line type oscillator, other circuits such as electron couple, Hartley, Colpits, and tuned plate-tuned grid oscillator circuits can be employed as well.

It is necessary now to consider the circuit which is associated with this oscillator circuit which produces the start-stop oscillation property and also the phase synchronization. This associated network is based on the diodes 73 and 75 and the terminal point 81. Let the bias voltage 80 be sufficiently negative so that the plates of diodes 73 and 75 are below the potential of the cathodes of 73 and 75. For this condition then the network surround terminal 81 is effectively isolated from the cathode circuit of oscillator tube 51. Consider the case now where a gate pulse from the deflection circuit 29 and the gating pulse amplifier 49 is applied to resistor 77 and terminal 81 with such polarity that the plate of diode 73 now becomes positive with respect to the cathode of diode 73. Also the plate of diode 75 is made positive with respect to the cathode of diode 75. Then there is introduced simultaneously a differentiated gate pulse into the cathode resistor 67, the differentiation circuit being composed of the condenser 7 and the resistor 67. This differentiated gate pulse causes the cathode of oscillator tube 51 to be made positive with respect to the grid of the tube of oscillator tube 51 to such an extent that the oscillation is caused to nearly or completely cease. At the same time the terminal point 81 is raised in potential such that diode 73 conducts and the horizontal sync pulse and the burst which are illustrated in Figure 2 are introduced into the grid circuit of the oscillator such that this horizontal sync pulse and burst with the horizontal sync pulse in a negative direction appears across the resistor 70. This horizontal sync pulse is in such a direction as to add to the effect of the differentiated kickback gating pulse and is made of suitable amplitude so the oscillator will cease oscillation completely. With the gating pulse so formed that it is decreasing in amplitude rapidly during the time of the burst, the burst is thereby introduced into the grid circuit of the free-running oscillator, and since the oscillator at this time is in the process of starting, it will start in the phase and frequency as prescribed by the burst and will operate at this frequency and phase throughout the scanning line until the next kickback gating pulse at which time the oscillator will be cut off and the entire process will start again.

What is claimed is:

1. In a color television receiver, the combination comprising means for receiving color television signals having a synchronizing burst of a reference signal following the horizontal synchronizing pulse, an oscillator having an output frequency substantially close to that of the reference signal, a gate between said oscillator and said color television signal receiving means, means to develop a gating pulse, means for utilizing said gating pulse to open said gate between said oscillator and said color television signal receiving means, means for differentiating the leading edge of said gating pulse, means for utilizing said differentiated leading edge of said gating pulse to start the turning off of said oscillator, means for utilizing said horizontal synchronizing pulse to complete the turning off of said oscillator, and means for injecting said burst of reference signal into said oscillator to start said oscillator in proper phase.

2. The color receiver as set forth in claim 1 and wherein said oscillator is a delay-line oscillator.

3. In a color television receiver adapted to receive a color television signal including color synchronizing bursts having a prescribed frequency and phase, the combination of an oscillator, a gate pulse circuit means including apparatus for producing a gate pulse having a prescribed duration interval prior to each of said color synchronizing bursts, means for utilizing said gate pulses for causing said oscillator to substantially reduce its oscillation level from a first prescribed level to a second prescribed level, and means for injecting said color synchronizing bursts into said oscillator after said pulses to cause said oscillator to resume oscillation at said first amplitude level phase locked at the frequency and phase of said color synchronizing bursts.

4. In combination in a color television receiver, an oscillator, a source of horizontal synchronizing pulses each followed by a color synchronizing burst having a prescribed phase and frequency, means responsive to said horizontal synchronizing pulses to disable said oscillator prior to said burst, and means for injecting said color synchronizing bursts into said oscillator to injection lock the frequency and phase of the oscillations produced by said oscillator to the frequency and phase of said color synchronizing bursts for a period during and following said bursts.

5. In a color television receiver adapted to receive a color television signal including color synchronizing bursts having a prescribed frequency and phase during each retrace interval, a color synchronizing circuit comprising in combination; a color oscillator generating an output signal having substantially the frequency of said bursts, means to disable said color oscillator during the retrace interval for a prescribed interval prior to each burst, and means responsive to said bursts to injection-lock the frequency and phase of said output signal.

6. In a color television receiver adapted to receive a color television signal including color synchronizing bursts having a prescribed frequency and phase during each retrace interval, a color synchronizing circuit comprising in combination; means to separate said bursts from said color television signal, a signal source to produce oscillations having substantially the frequency of said bursts, means to reduce the oscillation level of said signal source for a time interval during each retrace interval prior to each of said bursts, and means responsive to said separated bursts to control the frequency and phase of said oscillations following said time interval during which said oscillation level is reduced.

7. In a color television receiver adapted to receive color television signals having a synchronizing burst of a reference signal following the horizontal synchronizing pulse, a color synchronizing circuit comprising in combination, an oscillator having an output signal with a frequency substantially close to that of the reference signal, means responsive to said horizontal synchronizing pulse to turn off said oscillator prior to each burst, means for injecting said burst into said oscillator to cause said oscillator to resume the generation of oscillations according to the phase and frequency of said burst, and means for utilizing output of said oscillator in said color television receiver circuit.

8. The invention as set forth in claim 7 wherein said oscillator includes a grid circuit and wherein said reference-signal burst is injected into said grid circuit.

9. In a color television receiver circuit adapted to recive television signals, having a synchronizing burst of a reference signal following the horizontal synchronizing pulse, a synchronizing circuit comprising in combination, an oscillator generating an output signal having a frequency substantially close to that of the reference signal, a gating pulse, means for utilizing said gating pulse to reduce the amplitude of said output signal of said oscillator, means for utilizing said horizontal synchronizing pulse to further reduce the amplitude of said output signal of said oscillator, means responsive to said reference signal to control the frequency and phase of said output signal of said oscillator, and means for utilizing said output signal of said oscillator for color selection in said color television receiver circuit.

10. The color television receiver as set forth in claim 9 wherein said oscillator has a grid circuit and wherein the reference burst is injected into said grid circuit.

11. A color television synchronizing circuit having in combination, an oscillator, means to develop a color synchronizing burst having a duration interval during each retrace interval, means to develop a gating pulse having a leading edge starting prior to said duration interval of said bursts, means for gating off said oscillator during each retrace interval before each burst utilizing said gating pulse, means for differentiating the leading edge of said gating pulse, means for additionally utilizing said differentiated leading edge of said gating pulse for turning off said oscillator prior to said burst, and means for injecting said bursts into said oscillator at the end of said differentiated leading edge of said gating pulse to injection-lock the phase of oscillations developed by said oscillator.

12. The circuit as set forth in claim 11 and wherein a synchronizing pulse is utilized to complete the turning off of said oscillator prior to the end of said gating pulse.

13. An electronic synchronizing circuit, comprising in combination, an oscillator, means to develop intermittent bursts of a reference frequency wave, means to drive said oscillator into a quiescent state immediately prior to each of said bursts, means to allow said oscillator to restart from said quiescent state at time intervals substantially corresponding to the start of each burst, and means to inject said bursts into said oscillator to injection-lock the frequency and phase of oscillations produced by said oscillator.

14. In an electronic synchronizing circuit, the combination of, an oscillator, means to develop intermittent bursts of a reference frequency wave, a pulse generator for providing pulses having a prescribed duration interval and occurring shortly before each of said intermittent bursts, circuit means for coupling said pulse generator and said oscillator to drive said oscillator into a substantially quiescent state during a portion of each of said pulses from said pulse generator and means responsive to said bursts to cause said oscillator to resume oscillations from said substantially quiescent state at the frequency and phase prescribed by said intermittent bursts.

15. In a color television receiver adapted to receive intermittent bursts of a reference frequency wave, a color synchronized oscillator including a pulse generator for generating pulses having a prescribed duration interval and occurring shortly before each of said bursts, an oscillator having a grid-cathode circuit, circuit means for coupling said pulse generator and said intermittent bursts to said grid-cathode circuit of said oscillator to cause the amplitude level of oscillations produced by said oscillator to be reduced from a first prescribed amplitude level to a second prescribed amplitude level during each of said pulses and means to apply the intermittent bursts to said grid-cathode circuit of said oscillator to cause said oscillator to resume oscillations after each of said pulses at substantially said first prescribed amplitude level at a frequency and phase prescribed by said intermittent bursts.

16. In a color television system, a source of a video signal having a deflection synchronizing pulse followed by a burst of oscillations during each retrace interval and having picture information during each trace interval, an oscillator having a frequency substantially equal to the frequency of said bursts, and gating means operative to couple said video signal to said oscillator solely during said retrace interval at a level and with a polarity such that said deflection synchronizing pulse turns the oscillator off for the duration of said pulse, said oscillator thereafter being free to oscillate and be injection-locked by said bursts.

17. In a color television system, a source of a video signal having a deflection synchronizing pulse followed by a burst of oscillations during each retrace interval and having picture information during each trace interval, an oscillator having a frequency substantially equal to the frequency of said bursts, a gate circuit coupling said source of video signal to said oscillator, a source of a gating signal coupled to said gate circuit to cause the gate circuit to pass the synchronizing pulse and the burst to said oscillator, said synchronizing pulse being of such polarity as to stop said oscillator, and a differentiator circuit coupled from said source of gating signal to said oscillator to assist said synchronizing pulse in stopping said oscillator, whereby said oscillator thereafter begins oscillating and is injection-locked by said bursts.

References Cited in the file of this patent

UNITED STATES PATENTS

| | | |
|---|---|---|
| 2,653,187 | Luck | Sept. 22, 1953 |
| 2,712,568 | Avins | July 5, 1955 |
| 2,713,612 | Nero | July 19, 1955 |
| 2,740,046 | Tellier | Mar. 27, 1956 |